United States Patent
Pasquet

(10) Patent No.: US 12,454,257 B2
(45) Date of Patent: Oct. 28, 2025

(54) BRAKE CALLIPER FOR A VEHICLE COMPRISING A BRAKING CONTROL UNIT

(71) Applicant: ASTEMO FRANCE, Drancy (FR)

(72) Inventor: Thierry Pasquet, Vincennes (FR)

(73) Assignee: ASTEMO FRANCE, Drancy (FR)

( * ) Notice: Subject to any disclaimer, the term of this patent is extended or adjusted under 35 U.S.C. 154(b) by 0 days.

(21) Appl. No.: 16/621,504

(22) PCT Filed: Jun. 12, 2018

(86) PCT No.: PCT/FR2018/051361
§ 371 (c)(1),
(2) Date: Dec. 11, 2019

(87) PCT Pub. No.: WO2018/229411
PCT Pub. Date: Dec. 20, 2018

(65) Prior Publication Data
US 2020/0114891 A1    Apr. 16, 2020

(30) Foreign Application Priority Data
Jun. 12, 2017 (FR) ...................... 17 55238

(51) Int. Cl.
*B60T 13/58* (2006.01)
*B60Q 1/44* (2006.01)
(Continued)

(52) U.S. Cl.
CPC ............ *B60T 13/588* (2013.01); *B60Q 1/441* (2013.01); *B60T 1/065* (2013.01); *B60T 7/042* (2013.01);
(Continued)

(58) Field of Classification Search
CPC ........ B60T 13/741; B60T 13/745; B60T 8/88; B60T 2270/402; B60T 13/588; B60T 13/16; B60T 13/662; B60T 13/746; B60T 7/042; B60T 8/17; B60T 8/1755; B60T 17/22; B60T 2270/30; B60T 2270/404; B60T 2270/82; B60T 1/065; B60Q 1/441
See application file for complete search history.

(56) References Cited

U.S. PATENT DOCUMENTS 5,421,643 A * 6/1995 Kircher ................... B60T 7/042
                                                     180/165
6,345,225 B1    2/2002 Boehm et al.
(Continued)

FOREIGN PATENT DOCUMENTS

JP    2001523619 A    11/2001
JP    2014097761 A     5/2014
(Continued)

OTHER PUBLICATIONS

International Search Report for International Application No. PCT/FR2018/051361, dated Aug. 7, 2018.
(Continued)

*Primary Examiner* — Bradley T King
(74) *Attorney, Agent, or Firm* — McDonald Hopkins LLC

(57) ABSTRACT

A calliper for an electromechanical disc brake for a vehicle wheel. The calliper comprises a control unit configured to control the braking of the wheel, the control unit being intended to be electrically connected to a braking control line of the vehicle.

15 Claims, 2 Drawing Sheets

(51) Int. Cl.
  *B60T 1/06* (2006.01)
  *B60T 7/04* (2006.01)
  *B60T 8/17* (2006.01)
  *B60T 8/1755* (2006.01)
  *B60T 13/16* (2006.01)
  *B60T 13/66* (2006.01)
  *B60T 13/74* (2006.01)
  *B60T 17/22* (2006.01)

(52) U.S. Cl.
  CPC .............. *B60T 8/17* (2013.01); *B60T 8/1755* (2013.01); *B60T 13/16* (2013.01); *B60T 13/662* (2013.01); *B60T 13/746* (2013.01); *B60T 17/22* (2013.01); *B60T 2270/30* (2013.01); *B60T 2270/402* (2013.01); *B60T 2270/404* (2013.01); *B60T 2270/82* (2013.01)

(56) References Cited

U.S. PATENT DOCUMENTS

| | | | |
|---|---|---|---|
| 2002/0117891 A1* | 8/2002 | Harris | B60T 8/4081 |
| | | | 303/20 |
| 2006/0015231 A1* | 1/2006 | Yoshimura | B60T 7/12 |
| | | | 701/48 |
| 2006/0162986 A1* | 7/2006 | Disser | G06F 11/0796 |
| | | | 180/402 |
| 2007/0199773 A1* | 8/2007 | Saito | B60T 13/746 |
| | | | 188/72.1 |
| 2007/0278856 A1 | 12/2007 | Craig et al. | |
| 2008/0105502 A1* | 5/2008 | Koth | B60T 7/085 |
| | | | 188/72.6 |
| 2008/0236964 A1* | 10/2008 | Kikuchi | F16D 65/18 |
| | | | 188/162 |
| 2009/0200124 A1* | 8/2009 | Heise | B60T 7/107 |
| | | | 188/162 |
| 2010/0241330 A1* | 9/2010 | Hartmann | B60T 13/746 |
| | | | 701/70 |
| 2011/0115282 A1* | 5/2011 | Dinkel | B60T 7/042 |
| | | | 303/3 |
| 2012/0130614 A1* | 5/2012 | Wiens | B60T 8/885 |
| | | | 701/70 |
| 2016/0009263 A1* | 1/2016 | Feigel | B60T 8/321 |
| | | | 303/15 |
| 2016/0207510 A1* | 7/2016 | Hauber | B60T 13/74 |
| 2017/0045105 A1* | 2/2017 | Hofmeister | F16D 55/225 |
| 2017/0197605 A1 | 7/2017 | Wako et al. | |
| 2018/0141530 A1* | 5/2018 | Kilmurray | B60T 13/662 |
| 2018/0194353 A1* | 7/2018 | Kilmurray | B60T 8/171 |
| 2018/0362009 A1 | 12/2018 | Bourlon et al. | |
| 2019/0003535 A1 | 1/2019 | Esnee et al. | |
| 2019/0161036 A1* | 5/2019 | Shimono | B60T 13/586 |
| 2020/0039488 A1* | 2/2020 | Rebholz-Goldmann | |
| | | | B60T 13/746 |

FOREIGN PATENT DOCUMENTS

| | | |
|---|---|---|
| JP | 2015047948 A | 3/2015 |
| JP | 2016107769 A | 6/2016 |
| JP | 2016161025 A | 9/2016 |
| JP | 2017065374 A | 4/2017 |
| WO | 2010023985 | 1/2012 |

OTHER PUBLICATIONS

Written Opinion for International Application No. PCT/FR2018/051361, dated Aug. 7, 2018.

Preliminary Search Report for French Patent Application No. 17 55238, dated Mar. 8, 2018.

U.S. Appl. No. 16/621,536, entitled "Modification of the Trajectory of a Vehicle Wheel in the Event of Steering System Failure", filed Dec. 11, 2019.

Translation of Japanese Office action issued in related JP Appl. No. 2020-518587, dated Sep. 8, 2023, 5 pages.

* cited by examiner

BRAKE CALLIPER FOR A VEHICLE COMPRISING A BRAKING CONTROL UNIT

TECHNICAL FIELD

The invention relates to braking systems for a vehicle and more particularly to braking a vehicle wheel in the event that an electronic stability control is failing.

STATE OF PRIOR ART

FIG. 1 represents a braking system 2 for an automotive vehicle according to a known design. The braking system 2 comprises brakes 6, an actuation system 3 and a control system 4.

The left front brake $6_{FL}$ and the right front brake $6_{FR}$ are hydraulic brakes which are controlled by the control system 4.

The control system 4 comprises a braking amplifier 40 and an electronic stability control 44. The electronic stability control 44 is configured to control the braking of the vehicle 1 by the front brakes $6_{FL}$, $6_{FR}$ and the rear brakes $6_{RF}$ and $6_{RR}$, as a function of the trajectory of the vehicle 1 and of the braking forces from a user and transmitted by the amplifier 40.

The amplifier 40 is electrically supplied by a power supply line 93. The electronic stability control 44 is electrically supplied by a power supply line 95, independently of the amplifier 40. The amplifier 40 and the electronic stability control 44 can control the brakes 6 independently of each other by a control network 8 of the vehicle 1.

However, this results in redundancies in the braking system 2, higher mass and overall size of the vehicle 1.

There is a need to brake a vehicle wheel in the event that a braking amplifier and/or an electronic stability control is failing, while limiting mass and complexity of the braking system.

DISCLOSURE OF THE INVENTION

The invention aims at solving at least partially the problems encountered in the solutions of prior art.

In this regard, one object of the invention is a calliper for an electromechanical disc brake of a vehicle wheel. The calliper comprises a control unit configured to control the braking of the wheel. The calliper comprises electrical connection means for electrically connecting the control unit to a braking control line of the vehicle.

The brake calliper enables the vehicle to be satisfactorily braked in the event that the braking control system is failing, in particular in the event that the braking amplifier is failing, while limiting mass, overall size and complexity of the braking system of the vehicle.

The invention can optionally include one or more of the following characteristics combined with each other or not.

Advantageously, the calliper comprises a hydraulic braking device, a hydraulic connection means, an electromechanical braking device, a supply connection means and a connection and data exchange means.

The hydraulic braking device is configured to ensure the service braking of the wheel. The hydraulic connection means is configured to connect the hydraulic braking device to a hydraulic circuit of the braking system of the vehicle. The electromechanical braking device is configured to ensure the parking braking and/or emergency braking of the vehicle. The supply connection means is configured to electrically connect the control unit and/or the electromechanical braking device to a power supply. The connection and data exchange means is configured to connect the control unit to the braking control line.

The invention also relates to a braking system for vehicle wheels. The braking system comprises at least one brake, a braking actuator and the braking control line.

The brake includes a calliper as defined above. The braking actuator is configured to be actuated by a user to brake the vehicle. The braking actuator comprises a brake pedal and/or a control knob. The braking control line connects the braking actuator to the control unit.

Advantageously, the brake is a front brake of the vehicle.

Advantageously, the braking system comprises a braking amplifier.

The braking amplifier is configured to increase the braking force transmitted by the actuator, the control unit being connected to the braking amplifier by the braking control line.

In the event that a failure of the amplifier is detected, the control unit is configured to control the braking of the wheel, when the braking actuator is actuated by the user.

Advantageously, the braking system comprises an electronic stability control configured to command the brake to brake the wheel, the control unit being connected to the electronic stability control by the braking control line.

In the event that a failure of the electronic stability control is detected, the control unit is configured to control the braking of the wheel, when the braking actuator is actuated by the user.

Advantageously, the braking system comprises a central control unit for the electronic stability control and/or for the braking amplifier, which is configured to control the braking by the brake via the brake control unit, when the brake is operating normally.

In the event that the braking control system is failing, in particular the braking amplifier and/or the electronic stability control is failing, the brake control unit is configured to control braking of the wheel independently of the braking amplifier and/or of the electronic stability control, in particular independently of the central control unit.

Advantageously, the braking system comprises a box in which the electronic stability control and the braking amplifier are located.

The box comprises a pressurising pump of a hydraulic braking circuit, which is configured to be controlled by the electronic stability control and by the braking amplifier.

Advantageously, the braking system comprises at least one braking light and a switch for turning on the braking light, the braking actuator comprising a brake pedal, the on or off state of the switch depending on the depression of the brake pedal.

In the event that a failure of the amplifier and/or the electronic stability control is detected, the control unit is configured to control the braking of the wheel, when it detects via the state of the switch that the brake pedal is depressed.

The invention also relates to a motor vehicle comprising a braking system as defined above, the vehicle being preferably an automotive vehicle.

BRIEF DESCRIPTION OF THE DRAWINGS

The present invention will be better understood upon reading the description of exemplary embodiments, in reference to the appended drawings in which.

DETAILED DISCLOSURE OF PARTICULAR EMBODIMENTS

Figure 1:
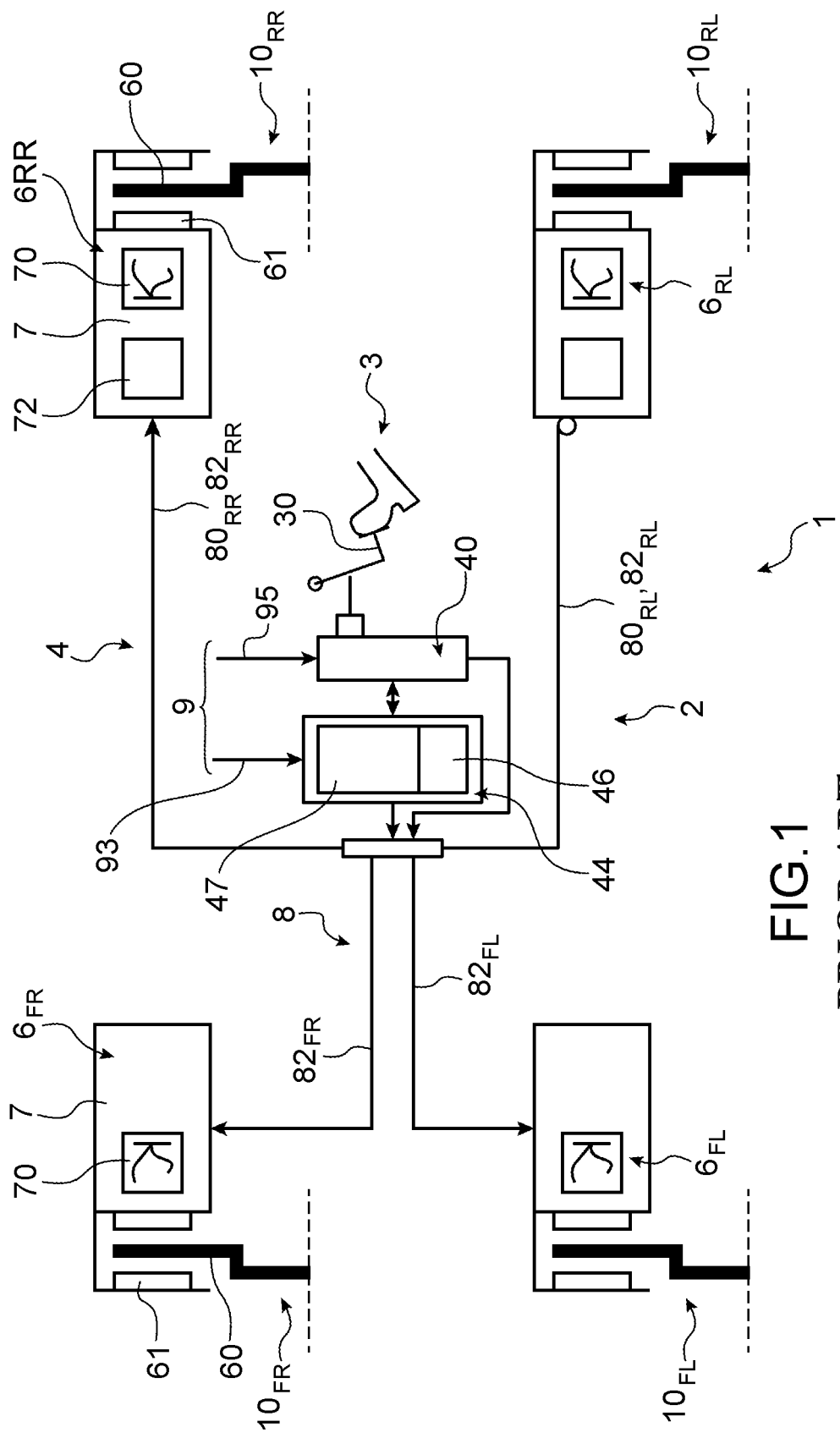
FIG. 1 is a partial schematic representation of a braking system for a vehicle according to a known design.

Identical, similar or equivalent parts of the different figures bear the same reference numerals so as to facilitate switching from one figure to the other.

Figure 2:
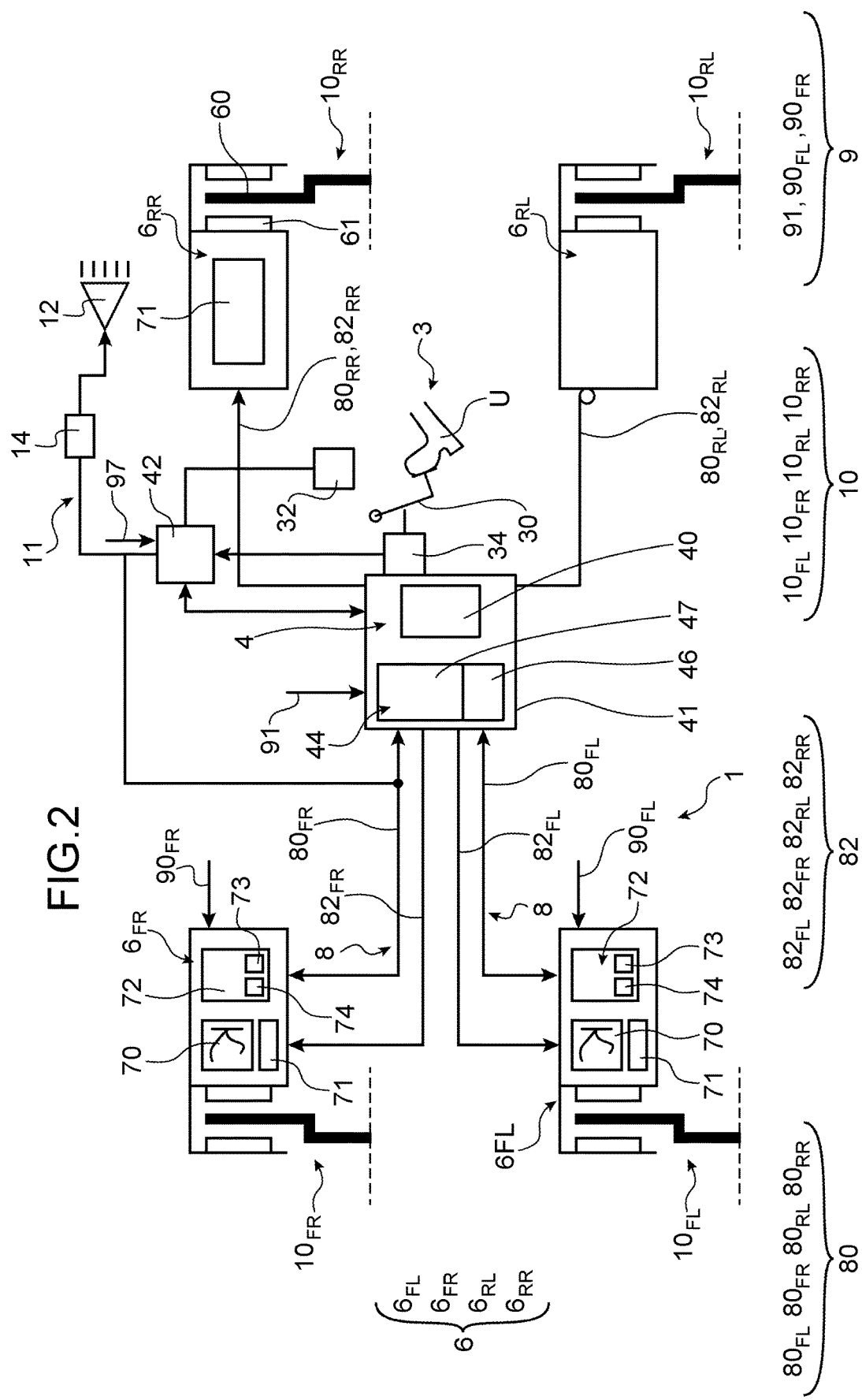
FIG. 2 is a partial schematic representation of a braking system for a vehicle according to a first embodiment of the invention.

FIG. 2 represents a motor vehicle 1. In the embodiment represented, this is an automotive vehicle. The vehicle 1 comprises a left front wheel $10_{FG}$, a right front wheel $10_{FR}$, a left rear wheel $10_{RG}$ and a right rear wheel $10_{RR}$. It also includes a braking system 2.

The braking system 2 is to brake the wheels 10 of the vehicle. It comprises disc brakes 6 to brake the wheels 10, an actuation system 3, a braking light system 11, a braking control system 4, a braking control network 8 and a power supply network 9.

The braking actuation system 3 comprises braking actuators 30, 32 and at least one actuation detector 34.

The actuators comprise a brake pedal 30 for service braking, and a control knob 32 for parking braking and emergency braking. The brake pedal 30 is to be depressed by a foot of a user U to brake the vehicle 1. The control knob 32 is a parking braking knob. The actuation detector 34 is connected to the control system 4 and it is used to detect the depression of the pedal 30 and/or of the control knob 32.

The braking light system 11 comprises at least one braking light 12 and a switch 14 for turning on the braking light. The on or off state of the switch 14 depends on the depression of the brake pedal 30. More precisely, an auxiliary control unit 42 of the control system 4 switches the state of the switch 14, when the detector 34 detects that the user U depresses the brake pedal 30.

The braking control system 4 comprises the braking amplifier 40, the electronic stability control 44, the auxiliary control unit 42 and a box 41.

The braking amplifier 40 is configured to increase the braking force which is transmitted by the brake pedal 30 to the control network 8, when the detector 34 detects the depression of the brake pedal 30.

The electronic stability control 44 comprises a hydraulic actuator 47 and a central control unit 46. It is configured to command each of the brakes 6 to brake the corresponding wheel 10 via the control network 8.

The hydraulic actuator 47 comprises a hydraulic accumulator and a pressurising pump of the hydraulic circuit 82 which is common to the braking amplifier 40 and to the electronic stability control 44.

The central control unit 46 is configured to control the hydraulic actuator 47. Generally, it controls the hydraulic and/or electromechanical braking of each of the left front $6_{FL}$, right front $6_{FR}$, left rear $6_{RR}$, and right rear $6_{RR}$ wheels independently of the others via the control network 8.

The electronic stability control 44 and the braking amplifier 40 are housed within a same box 41, which enables redundancies in the braking system 2 to be limited, mass and overall size of the braking system 2 to be limited.

The auxiliary control unit 42 controls the turning on or off of the braking light 12 through the state of the switch 14.

The brakes 6 are vehicle disc brakes. The vehicle 1 comprises a left front brake $6_{FL}$ to brake the left front wheel $10_{FL}$, a right front brake $6_{FR}$ to brake the right front wheel $10_{FR}$, a left rear brake $6_{RR}$ to brake the left rear wheel $10_{FL}$, a right rear brake $6_{RR}$ to brake the right rear wheel $10_{RR}$.

Each of the disc brakes 6 includes a floating type calliper 7, a piston 71 housed in a body of the calliper 7, a disc 60, and brake shoes 61 for clamping the disc 60 and movable by the piston 71.

Each calliper 7 comprises a hydraulic braking device 70 and an electromechanical braking device 72. The calliper 7 also includes a hydraulic connection means, a supply connection means and a connection and data exchange means.

The hydraulic braking device 70 is of a known structure. It enables the hydraulic braking of the corresponding wheel 6 to be ensured. It also ensures the service braking of the wheel 6. The hydraulic connection means is used to connect the hydraulic braking device 70 to the hydraulic circuit 82.

The electromechanical braking device 72 comprises an electromechanical actuator 74 and a local braking control unit 73. The electromechanical braking device 72 is connected to a CAN type network 80 of the control network 8 by a connection and data exchange means. It is electrically supplied, at least partially independently of the control system 4, by the supply network 9.

The electromechanical braking device 72 is configured to ensure the electromechanical braking of the corresponding wheel 10. It ensures in particular the parking braking and emergency braking of the wheel.

The electromechanical actuator 74 comprises an electric motor and a transmission device which causes the piston 71 to be moved when it is driven by the electric motor.

The local control unit 73 comprises a CAN interface through which it is connected by the control network 8 to the central control unit 46 and to the auxiliary control unit 42. This CAN interface is part of the connection means.

The local control unit 73 is configured to control the electric motor of the electromechanical actuator 74. Thus, it locally controls the braking of the wheel 6. When the brake 6 is operating normally, the control unit 73 is configured to control the braking of the brake 6 on command from the trajectory amplifier 40 and/or the central unit 46.

In the event that the control system 4 is failing, each of the control units 73 is configured to locally control the braking of the corresponding wheel 10, independently of the control system 4.

In particular, in the event that the amplifier 40 is failing, the control unit 73 is configured to control the braking of the wheel 10 to the electromechanical actuator 74, when the actuation detector 34 detects that the brake pedal 30 is depressed by the user U, in particular independently of the amplifier 40.

In the event that the electronic stability control 44 is failing, the control unit 73 is configured to control the braking of the wheel 10 to the electromechanical actuator 74, independently of the central control unit 46.

Each control unit 73 is configured to control the temporary reduction in the braking force exerted on the corresponding wheel 10 when this wheel 10 begins to slip. Thereby, it forms a local anti-lock system of the wheel 10. This local anti-lock system can act complementarily of a wheel anti-lock system of a known structure, which is also known as the acronym "ABS".

The control network 8 comprises a data transmission network 80 and a hydraulic circuit 82.

The data transmission network 80 is a CAN ("Control Area Network") type network. This CAN type network 80 fulfils in particular the conditions of the ISO 11898 standard.

The CAN type network 80 comprises braking control lines $80_{FL}$, $80_{FR}$, $80_{RL}$, $80_{RR}$ which connect the control units of the vehicle to each other, including the central control unit 46, the auxiliary control unit 42 and the control units 73 of the brakes 6.

The CAN type network 80 comprises a braking control line for the left front wheel $80_{FL}$, a braking control line for the right front wheel $80_{FR}$, a braking control line for the left rear wheel $80_{RL}$, a braking control line for the right rear wheel $80_{RR}$.

The braking control line for the left front wheel $80_{FL}$ connects the amplifier 40 and the electronic stability control 44 to the control unit 73 of the left front brake $6_{FL}$. The braking control line for the right front wheel $80_{FR}$ connects the amplifier 40 and the electronic stability control 44 to the control unit 73 of the right front brake $6_{FR}$.

The braking control line for the left rear wheel $80_{RL}$ connects the amplifier 40 and the electronic stability control 44 to the control unit 73 of the left rear brake $6_{RR}$. The braking control line for the right rear wheel $80_{RR}$ connects the amplifier 40 and the electronic stability control 44 to the control unit 73 of the right rear brake $6_{RR}$.

The hydraulic circuit 82 is a pressurising circuit for the brakes 6. It comprises a left front braking hydraulic line $82_{FL}$, a right front braking hydraulic line $82_{FR}$, a left rear braking hydraulic line $82_{RL}$, a right rear braking hydraulic line $82_{RR}$.

The left front braking hydraulic line $82_{FL}$ fluidly connects the hydraulic actuator 47 to the braking hydraulic device 70 of the left front brake $6_{FL}$. The right front braking hydraulic line $82_{FR}$ fluidly connects the hydraulic actuator 47 to the braking hydraulic device 70 of the right front brake $6_{FR}$.

The left rear braking hydraulic line $82_{RL}$ fluidly connects the hydraulic actuator 47 to the braking hydraulic device 70 of the left rear brake $6_{RR}$. The right rear braking hydraulic line $82_{RR}$ fluidly connects the hydraulic actuator 47 to the braking hydraulic device 70 of the right rear brake $6_{RR}$.

The supply network 9 comprises a power supply line 91 for electrically supplying the control system 4 in the box 41, a power supply line 97 for electrically supplying the auxiliary control unit 42, and a power supply line 90 for supplying each of the brakes 6.

More precisely, the supply network 9 comprises a power supply line $90_{FL}$ for the left front brake $6_{FL}$, a power supply line $90_{FR}$ for the right front brake $6_{FR}$, a power supply line $90_{FL}$ for the left rear brake $6_{RL}$, and a power supply line $90_{RR}$ for the right rear brake $6_{RR}$.

The supply network 9 is configured to provide energy to each of the electromechanical braking devices 72 in need thereof to operate independently of each other, including in the event that the control system 4 is failing.

The emergency braking method for the left front wheel $10_{FL}$ in the event that the control system 4 is failing is explained below.

When the control system 4 is failing, for example in the event that the amplifier 40 is failing, the braking power which is transmitted to each of the brakes 6 by the hydraulic circuit 82 is likely to be insufficient.

The local control unit 73 of the left front brake $6_{FL}$ is informed, by the CAN type network 80, about the failure of the control system 4 and that the brake pedal 30 is depressed.

The control unit 73 then decides to control the braking of the left front wheel $10_{FL}$, independently of the control system 4 to which it is slaved. Then, it commands the left front brake $6_{FL}$ to brake the wheel, whereas the brake pedal 30 is depressed.

The control unit 73 is programmed to enable an optimum braking of the left front wheel $10_{FL}$. It is in particular able to control a temporary reduction in the braking force exerted on the corresponding wheel 10 being the left front wheel $10_{FL}$, when this wheel $10_{FL}$ begins to slip.

The control unit 73 can continue controlling or not the braking of the left front wheel $10_{FL}$ until the vehicle 1 is completely stopped, depending on the driving situations.

The emergency braking method for the right front wheel $10_{FR}$, that for the left rear wheel $10_{RG}$ and that of the right rear wheel $10_{RR}$ are analogous to that explained above in reference for the left front wheel $10_{FL}$.

The emergency braking method implemented using callipers 7 of brakes according to the invention is particularly useful when the amplifier 40 and the electronic stability control 44 are joined in the box 41, and when a failure of the amplifier 40 is likely to cause a failure in the electronic stability control 44 and vice versa.

The callipers 7 according to the invention avoid in particular resorting to a safety hydraulic braking system which comprises a hydraulic actuator and a control unit. Such a safety hydraulic braking system is also known as the acronym "FBU".

Of course, various modifications can be provided by those skilled in the art to the invention just described without departing from the scope of the invention.

Generally, the motor vehicle 1 comprises at least three wheels including a right wheel and a left wheel. The motor vehicle 1 can be of different nature. Alternatively, the vehicle 1 is a three-wheel saddle type vehicle, a van, a lorry etc.

The braking light system 11 can include several braking lights 12, for example three braking lights 12. The braking lights 12 are in particular located at the rear of the vehicle 1.

The braking system 2 could be free of front and/or rear braking hydraulic line 82. The corresponding brakes 6 are thereby free of a braking hydraulic device 70, which limits their complexity, mass and overall size.

Alternatively, only the front brakes $6_{FL}$ and $6_{FR}$ each comprise a control unit 73 and the rear brakes $6_{RL}$ and $6_{RR}$ are free of a control unit 73.

Still alternatively, only the rear brakes $6_{RL}$ and $6_{RR}$ each comprise a control unit 73 and the front brakes $6_{FL}$ and $6_{FR}$ are free of a control unit 73.

Generally, it is very preferable that the brakes 6 of the drive wheels are each equipped with a local control unit 73.

NOMENCLATURE IN REFERENCE TO THE FIGURES

1: vehicle
2: braking system
3: actuation system
4: control system
6: brakes
$6_{FL}$: left front brake
$6_{FR}$: right front brake
$6_{RL}$: left rear brake
$6_{RR}$: right rear brake
8: braking control network
9: power supply network
10: wheels
$10_{FL}$: left front wheel
$10_{FR}$: right front wheel
$10_{RL}$: left rear wheel
$10_{RR}$: right rear wheel
11: braking light system
12: braking light
14: switch for turning on/off the braking light
30: brake pedal 32: control knob
34: actuation detector
40: amplifier
41: box
42: auxiliary control unit
44: electronic stability control
46: central control unit
47: hydraulic actuator
60: disc
61: brake shoe
70: braking hydraulic device
71: piston
72: electromechanical braking device
73: control unit
74: electromechanical actuator
80: CAN type network
$80_{FL}$: braking control line for the left front wheel
$80_{FR}$: braking control line for the right front wheel
$80_{RL}$: braking control line for the left rear wheel
$80_{RR}$: braking control line for the right rear wheel
82: hydraulic circuit
$82_{FL}$: left front braking hydraulic line
$82_{FR}$: right front braking hydraulic line
$82_{RL}$: left rear braking hydraulic line
$82_{RR}$: right rear braking hydraulic line
$90_{FL}$: power supply line for the left front brake
$90_{FR}$: power supply line for the right front brake
$90_{FL}$: power supply line for the left rear brake
$90_{RR}$: power supply line for the right rear brake.

The invention claimed is:

1. A braking system for each wheel of a vehicle, comprising:
    an electromechanical disc brake for each wheel of the vehicle, each electromechanical disc brake comprising a calliper, the calliper of each electromechanical disc brake for each wheel of the vehicle comprising:
        a control unit comprising a processor, wherein the control unit is configured to control the braking of the wheel, and
        an electrical connector configured to electrically connect the control unit to a braking control line of the vehicle;
    a braking amplifier configured to increase the braking force transmitted by a braking actuator, wherein the control unit is connected to the braking amplifier by the braking control line and the braking actuator is configured to be actuated by the user to brake the vehicle;
    an electronic stability control configured to command the electromechanical disc brakes to brake the corresponding wheel, wherein the control unit is connected to the electronic stability control by the braking control line,
    a power supply, and
    a box in which the electronic stability control and the braking amplifier are located,
    wherein, in the event that a failure of the braking amplifier is detected, the control unit of the corresponding calliper is configured to locally control the braking of the wheel, when the braking actuator is actuated by the user,
    wherein, in the event that a failure of the electronic stability control is detected, the control unit of the corresponding calliper is configured to locally control the braking of the wheel, when the braking actuator is actuated by the user,
    wherein, in the event that a failure of the electronic stability control is detected, the control unit of the corresponding calliper is a local anti-lock system of the wheel, wherein the control unit is configured to control temporary reduction in the braking force exerted on a corresponding wheel when the corresponding wheel begins to slip, and
    wherein the electronic stability control and the braking amplifier are connected to the power supply by a power supply line.

2. The braking system according to claim 1, wherein at least one of the calipers of the electromechanical disc brakes for each wheel of the vehicle further comprises:
    a hydraulic braking device configured to ensure the service braking of the wheel,
    a hydraulic connector configured to connect the hydraulic braking device to a hydraulic circuit of the braking system of the vehicle, and
    an electromechanical braking device configured to ensure parking braking and/or emergency braking of the vehicle.

3. The braking system for vehicle wheels according to claim 2, wherein at least one of the calipers of the electromechanical disc brakes for each wheel of the vehicle comprises a supply connector configured to electrically connect the control unit and/or the electromechanical braking device to the power supply, and
    a connection and data exchange port configured to connect the control unit to the braking control line.

4. The braking system according to claim 1, further comprising:
    the braking actuator comprising a brake pedal and/or a control knob, and
    the braking control line which connects the braking actuator to the control unit.

5. The braking system according to claim 4, comprising a supply connector for electrically connecting the control unit and/or an electromechanical braking device to the power supply,
    a connection and data exchange port configured to connect the control unit to the braking control line,
    the braking amplifier configured to increase the braking force transmitted by the braking actuator, wherein the control unit is connected to the braking amplifier by the braking control line, and
    wherein, in the event that a failure of the braking amplifier is detected, the control unit is configured to control the braking of the wheel, when the braking actuator is actuated by the user.

6. The braking system according to claim 5, wherein the box comprises a pressurising pump of a hydraulic braking circuit, which is configured to be controlled by the electronic stability control and by the braking amplifier.

7. The braking system according to claim 1, comprising at least one braking light and a switch for turning on the braking light, the braking actuator comprising a brake pedal, wherein the on or off state of the switch depends on the depression of the brake pedal,
    wherein, in the event that a failure of the amplifier and/or of the electronic stability control is detected, the control unit is configured to control the braking of the wheel, when it detects via the state of the switch that the brake pedal is depressed.

8. A motor vehicle comprising the braking system according to claim 4.

9. The motor vehicle according to claim 8, wherein the vehicle is a passenger car.

10. The braking system according to claim 1, wherein at least one of the calipers of the electromechanical disc brakes for each wheel of the vehicle includes an electromechanical braking device comprising an electromechanical actuator which includes an electric motor, wherein each control unit is configured to control the braking of the corresponding wheel by controlling the electric motor of the electromechanical actuator, in the event of a failure of the braking amplifier.

11. The braking system according to claim 1, wherein at least one of the calipers of the electromechanical disc brakes for each wheel of the vehicle includes an electromechanical braking device comprising an electromechanical actuator which includes an electric motor, wherein each control unit is configured to control the braking of the corresponding wheel by controlling the electric motor of the electromechanical actuator, in the event of a failure of the electronic stability control.

12. The braking system according to claim 10, wherein the braking system includes a piston housed in at least one of the calipers of the electromechanical disc brakes for each wheel of the vehicle, wherein the electromechanical actuator includes the electric motor and a transmission device for moving the piston when it is driven by the electric motor.

13. The braking system according to claim 11, wherein the braking system includes a piston housed in at least one of the calipers of the electromechanical disc brakes for each wheel of the vehicle, wherein the electromechanical actuator includes the electric motor and a transmission device for moving the piston when it is driven by the electric motor.

14. The braking system according to claim 1, wherein the braking amplifier and the electronic stability control are disposed in a central control unit that is bypassed in the event that a failure of the amplifier and/or the electronic stability control is detected, wherein the control unit is configured to control the braking of the wheel when the braking actuator is actuated by the user.

15. The braking system according to claim 1, wherein, in the event that a failure of the braking amplifier is detected or in the event that a failure of the electronic stability control is detected, the control unit is configured to locally control the braking of the wheel independent of a main control system of the braking system.

* * * * *